Patented Apr. 14, 1942

2,279,526

UNITED STATES PATENT OFFICE 2,279,526

SOLUBLE PHENOLIC RESIN

Israel Rosenblum, New York, N. Y.

No Drawing. Application December 3, 1938,
Serial No. 243,881

21 Claims. (Cl. 260—25)

My invention relates to the production of fusible and soluble condensates of a phenol, an aldehyde and a liquid terpene or liquid substituted terpene suitable for the manufacture of coating compositions of various kinds, and more particularly to the production of resins of this type which are soluble in the common varnish oils and solvents.

The present application is a continuation in part of my co-pending applications Serial No. 102,331, filed September 24, 1936; Serial No. 116,822, filed December 19, 1936 and Patent No. 2,207,384; and Serial No. 225,722, filed August 19, 1938.

Stated briefly, the present invention involves the use of a liquid terpenic material, such as dipentene, as a reactant in a phenol-aldehyde condensation and/or polymerization, and particularly in connection with a condensate obtained by reaction of a phenol and an aqueous aldehyde under strongly basic conditions, followed by acidification and separation of the condensate, the condensate being, if desired, incorporated in a suitable natural resin, such as rosin, which may or may not be neutralized, as with a polyhydric alcohol, or fused with ester gum, polymerized dipentene, alpha terpineol, and other terpenic materials in the presence of a catalyst. This latter resin may if desired be combined with rosin or ester gum or with other suitable natural resins or their neutralization products.

Ordinarily, when a phenol and particularly ordinary phenol, and a relatively large proportion of formaldehyde, such as an amount considerably in excess of equimolecular proportions, are condensed with the aid of sufficient basic and particularly alkali catalyst to keep the product in aqueous solution, the condensation must be effected at relatively low temperatures and for very long periods of time. This process is objectionable, aside from the time factor, also because on acidification a more or less water-soluble condensate is obtained which does not separate out. On the other hand, if elevated temperatures are employed during the condensation, then upon precipitation with acid, a difficulty manipulable mass results which if heated, for example, to about 100° C. or above, to effect removal of water and/or cause further condensation, is decomposed or converted into an infusible material. This occurs even when the phenol is a substituted phenol, such as butyl or amyl phenol, or a higher phenol (having a substituting group of more than five carbon atoms), such phenols ordinarily producing fusible condensates under conditions which yield infusible products with the lowest phenol in the homologous series (carbolic acid). I have, however, found that when the condensation is made to take place in the presence of a liquid terpenic material, such as dipentene, fusible, non-charring resins are obtained under conditions which in the absence of the dipentene would produce infusible or decomposable condensates. Investigation has shown that part of the dipentene, for example, is chemically bound and cannot be expelled with steam or with the aid of vacuum. Condensation in the presence of dipentene and aqueous alkali catalyst, followed by acidification and dehydration, accompanied if desired by expulsion of excess dipentene with the aid of the evaporating water or with the aid of steam or vacuum, produces a resin which, unlike other condensation products of similar nature but produced in the absence of dipentene or equivalent terpenic material, remains fusible at as high a temperature as 120° C. and even much higher according to the excess of dipentene present or the acid used. That the dipentene, for example, enters into the reaction at and even below the temperature of condensation is indicated by the fact that a uniform clear mixture is obtained on warming the mixture of the phenol, aqueous formaldehyde, alkali and dipentene, in spite of the fact that dipentene is not miscible with water. As much as 60% of the original quantity of dipentene remains combined in the product, such quantity corresponding to about 10 to 15% by weight, and even more, of the resin. Greater amounts of dipentene or other liquid terpenic material can be incorporated in the final product if, as described below, mineral acid is present during the heating after the acidification and especially if more terpenic material is added at such time.

The amount of dipentene that can be incorporated in clear solution with the condensing mixture of a phenol and formaldehyde in the presence of aqueous alkali is more or less limited, and the product obtained upon the precipitation with acid, contains, as already pointed out, an amount of dipentene of the order of about 10% of the resin. This acid-precipitated condensate, in contrast to known acid-precipitated, phenol-formaldehyde resins produced under alkaline conditions, is liquid in character, separates readily from the water, and its further heating, as for purposes of dehydration, can be easily controlled, the resin remaining soluble in varnish oils and solvents. This resin is capable of hardening natural resins and their esters, such as rosin and ester gum to an unusual degree, and can be employed either in the freshly precipitated liquid condition or after dehydration and limited heating until it is solid at room temperature. The terpenic material accordingly permits increase of the speed of reaction, permitting temperatures as high as 80° C. and even higher to be employed during the initial condensation, four to five hours of heating being frequently sufficient prior to the acidification. The terpenic material is likewise responsible for the obtainment of the acid-precipitated resin in the liquid condition, in which it can be easily handled and further heated without danger of decomposition or conversion to the insoluble and/or infusible state.

On the other hand, if the acid-precipitated condensate is heated to high temperatures, say 200° and above, and especially if further quantities of terpenic material, such as dipentene, are added, and the heating conducted in the presence of a catalyst, such as a strong inorganic or organic acid, or strongly acid salts, such as aluminum and zinc chlorides, a resin is obtained which is no longer characterized by the property of greatly raising the melting point of natural resins and their esters but which nevertheless is characterized, like the resin just discussed, by high resistance to alkali, good color retention and the capacity to produce long oil varnishes, and like such other resin, can be used alone for the manufacture of varnishes. This high temperature product, which is rather non-reactive, can be mixed with natural and synthetic resins in various proportions.

I prefer to have some of the terpenic material present during the alkali condensation, although in some cases equally as good resins can be obtained by heating the acid-precipitated resin for the first time with, for example, dipentene, in the presence of any of the above mentioned catalysts. The heating of the acid-precipitated resin, whether produced in the presence or absence of terpenic material during the condensation, with terpenic material in the presence of, for example, sulfuric acid, changes the character of the initial resin. The resin becomes generally more soluble and less reactive, even when heated to only about 80° C. When the initial condensation takes place in the presence of terpenic material, and more of such material is added after the acid precipitation, together with sulfuric acid or the like, I prefer to heat the mixture to high temperatures (200° C. or above), which results in the production of a solid and oil-soluble, non-reactive resin in high yield. By such procedure, so much dipentene or the like can be incorporated in the product that it may amount to about 40% and even somewhat more of the total resin.

While it is for certain purposes desirable to dehydrate the acid-precipitated resin, I have found that it is possible to use such resin, without previous dehydration, for incorporation, for example, in rosin, the dehydration and further polymerization of the resin occurring during the heating with the natural resin.

The condensate so obtained is suitable for the manufacture of varnishes, paints and other coating compositions and is compatible with natural resins, such as colophony, and their esters and with other synthetic resins.

The resins precipitated by the acidification of the alkaline condensation mass in accordance with the invention, and generally containing in the neighborhood of 10% of dipentene or the like, are particularly characterized by the relatively high proportions in which they can be mixed with natural resins and ester gum and by the high degree by which they raise the melting points of such materials.

In carrying out my invention, a substituted phenol, with or without an admixture of ordinary phenol, preferably in minor proportions, and aqueous aldehyde, preferably formaldehyde, are first condensed with the aid of a sufficient amount of basic agent to keep the condensate in solution, dipentene or other terpenic material being present during such condensation, after which the resin is brought out of solution by acidification. Dipentene may now be added to the condensate for the first time, or the amount remaining with the condensate may be increased, and the latter then heated to higher temperatures to complete the reaction and drive off volatile material until a resin which is solid at room temperature is obtained; or the separated condensate may be heated with rosin before or after dehydration, or with ester gum, free rosin being neutralized, as by adding glycerol simultaneously therewith or at higher temperatures, say 180° C., a catalyst such as zinc acetate being preferably added along with the rosin, ester gum, or glycerol.

In place of dipentene, the polymers of dipentene may be used, such as the product obtained by heating with sulphuric acid, and where in the claims I speak of dipentene, such polymers are included as equivalents. Pine oil, or the individual terpenic components thereof, such as alpha-terpineol (dipentene is contained to the extent of about 10% in pine oil), and also turpentine, or mixtures of these substances may be used.

Among the phenolic materials that may be employed in my process are the substituted phenols and the condensation products of phenols and ketones. The xylenols, butyl, diisobutyl, amyl and octyl phenols, ortho and para cresols and mixtures of cresols give very satisfactory resins, but other substituted phenols capable of forming resinous condensates with an aliphatic aldehyde, such as formaldehyde, can likewise be employed either alone or mixed with a lower phenol; in general, phenols having substituents totalling at least two carbon atoms are suitable. Para phenyl phenol can likewise be employed. Ordinary phenol is not satisfactory alone, but small proportions of it may be mixed with butyl, amyl or other higher phenols. Dihydroxydiphenyldimethyl methane $((C_6H_4OH)_2:C:(CH_3)_2)$ and its homologues, and condensates of other phenols with acetone, or with methyl ethyl ketone, methyl butyl ketone, cyclohexanone, diethyl ketone, aromatic ketones such as acetophenone, etc. may be used alone or mixed with a phenol.

The condensates of the phenolic body, aldehyde and dipentene or the like may be finished to the hard brittle condition by heating to elevated temperatures to effect further reaction and drive off volatile matter; or they may be brought to the plastic or even left in the viscous, syrupy condition. Where the condensate is incorporated with a natural resin, the dehydration may take place prior to such incorporation, or after combination with the natural resin.

The acid-precipitated initial condensate, prepared in the presence or absence of a liquid terpene material such as dipentene, may be heated with a relatively large proportion of such terpene material in the presence of a small amount of sulfuric acid as catalyst, for example of the order of about ¼% of 100% sulfuric acid, based on the weight of the initial condensate. In this way, large proportions of the terpene material are chemically incorporated in the product.

With the aid of dipentene and other terpenic materials, not only can considerably higher temperatures be employed, thereby giving more desirable condensates, as already mentioned, but higher proportions of formaldehyde to phenol can safely be utilized, whereby more highly resistant resins are produced. Thus with the aid of dipentene two or even more mols of formaldehyde may be employed to each mol of butyl or amyl or similar higher phenol and yet produce an oil-soluble resin.

The invention will be further described by way of illustration with the aid of the following examples:

Example I

| | |
|---|---|
| Butyl phenol | 825 grams (5½ mols) |
| Formaldehyde (40% solution) | 743 grams (9.9 mols) |
| Dipentene | 220 grams |
| Sodium hydroxide | 100 grams dissolved in 733 grams of water | are warmed together, a clear uniform solution being thereby formed. The inter-reaction of these materials is slightly exothermic. The mixture is heated at a temperature of 60 to 90° C. to effect condensation, the higher temperatures being employed for shorter periods of time. Thus at 60 C. the mixture may be heated for 5 to 10 hours, while at 90° one to two hours heating is employed, depending upon the degree of condensation desired.

The mixture, without cooling, is then treated with dilute acid, such as hydrochloric, sulphuric, acetic, etc., until all of the sodium hydroxide has been neutralized and the mixture is slightly acid. A sharp separation into definite layers takes place, the lower layer consisting mainly of a solution of sodium salt in most of the water, while the upper layer containing the resin, uncombined dipentene and some water, is separated and washed with hot water until free of acid and sodium salt. The condensate-dipentene reaction product is cloudy, but can be easily clarified and brought to a brittle condition by dehydration, as by heating to 140-150° C. This operation is smooth and presents no technical difficulties. During this heating, a large part of the dipentene is expelled, but about 10% (by weight, based on the weight of resin) is retained in the product, apparently all in chemical combination in the product.

The product is a hard, clear, brittle resin which is soluble in varnish oils, such as linseed and China-wood oils, in which it can be heated to high temperatures without charring. It forms excellent films characterized particularly by high weather and alkali resistance. It can be incorporated in a considerably larger proportion of rosin, preferably in presence of zinc acetate, and the mixture then treated with about 10% of glycerol based on the weight of the rosin at temperatures up to about 250° C., the melting point of the glycerol-rosin ester being thereby increased and likewise its resistance to alkalis.

Example II

| | |
|---|---|
| Paratertiary amyl phenol | 164 grams (1 mol) |
| Formaldehyde (40% solution) | 135 grams (1.8 mols) |
| Dipentene | 46 grams | are mixed together and to the mixture are added gradually under stirring 40 grams (1 mol) of sodium hydroxide dissolved in 135 grams of water. The procedure outlined in Example I is followed, the amount of acid employed for the final precipitation of the resin being 5% in excess of that required to neutralize all of the sodium hydroxide. The dehydration is carried out up to 120-130° C. and the product contains about 10-15% dipentene, at least a large part of which appears to be chemically bound therein. The product, like that obtained in Example I, is a clear, brittle resin which is soluble in vegetable oils and produces highly satisfactory films. Like the product of Example I, the resin can be combined with an acidic natural resin, followed by esterification, or it can be fused and mixed with ester gum.

Example III

| | |
|---|---|
| Dihydroxydiphenyldimethylmethane | 1 mol |
| Formaldehyde (40% solution) | 135 grams (1.8 mols) |
| Dipentene | 46 grams |
| Sodium hydroxide | 40 grams dissolved in 135 grams of water | are heated together at temperatures of 60 to 90° C. as described in Example I, the condensate being in solution. The condensate is then thrown out of solution with an amount of a relatively strong inorganic or organic acid corresponding to an excess of about 5% based upon the quantity of sodium hydroxide. The resinous material is separated from the aqueous layer and is washed until free from acid and salt. This condensate contains about 68% of resin, as determined by heating a sample thereof until all water and uncombined material have been expelled and a product solid at room temperatures is obtained.

This product is then further worked up as follows:

| | Grams |
|---|---|
| Dihydroxydiphenyldimethylmethane | 165 |
| Rosin | 1,000 |
| Glycerol | 100 |
| Dipentene | 50 |
| Zinc acetate (corresponding to 0.1% of zinc oxide based on the rosin) | 2 | are mixed and condensed by heating under pressure or under reflux over night at about 105° C. The reflux condenser is then removed and the mass is dehydrated by slowly raising the temperature, and is finally heated at about 250° C. until esterification is complete and all volatile matter has been expelled. A hard, clear resin is obtained having a melting point of 117° C. It is soluble in all the common varnish solvents and is compatible with all the common varnish oils, yielding with drying oils fast-drying varnishes characterized by a remarkably high resistance to alkalis. The content of dihydroxydiphenyldimethylmethane formaldehyde resin in the product is about 10%.

Example IV

An initial condensate is prepared as described in Example III, except that an equivalent amount of butyl phenol is substituted for the dihydroxydiphenyldimethylmethane. 370 grams of this condensate (containing volatile and unreacted materials, the resinous content being about 68%) is then mixed with

| | Grams |
|---|---|
| Rosin | 1,000 |
| Dipentene | 150 |
| Zinc acetate | 3 | and condensation then carried out as described in Example III, except that the dehydration is effected by slow heating to about 180° C. At this point, 110 grams of glycerol are added and the temperature gradually raised to about 250° C. and heating continued at this temperature until the esterification is complete. A very hard resin is obtained (melting point 130° C.) having solubility characteristics and high alkali resistance similar to that of the product described in connection with Example III. The phenol-aldehyde resin content of this product is about 20%.

Example V

If desired, the initial butyl phenol condensate described in Example IV (heated to a maximum temperature of about 140° C.) can be heated simultaneously with the rosin and glycerol. Thus, when the following materials:

|  | Grams |
| --- | --- |
| Rosin | 1,000 |
| Butyl phenol-formaldehyde-dipentene condensate | 200 |
| Dipentene | 100 |
| Glycerol | 100 | are reacted, preferably although not necessarily, in the presence of a catalyst, such as an organic or inorganic compound of zinc, including the oxide, acetate, abietate, etc., are condensed for a number of hours under reflux and then dehydrated at higher temperatures and finally heated to 250° C. to complete the esterification, a resin similar to that obtained in Example IV is produced.

Example VI

The process of any of the preceding examples can be modified by substituting the phenolic material in whole or in part by cresylic acid or xylenols.

Example VII

A resin derived from the interaction of butylphenol, formaldehyde and dipentene in the presence of a sufficient amount of NaOH to keep the condensate in solution, wherefrom the NaOH has been removed by neutralization and washing with water, the proportions taken being:

|  | Parts |
| --- | --- |
| Butylphenol | 100 |
| 40% formaldehyde solution | 100 |
| Dipentene | 25 | is treated further with 70 parts dipentene which brings up the dipentene proportion to the rate of 1 mol dipentene to 1 mol of phenol. A uniform solution is obtained, which can be further diluted with solvent naphtha. To this solution 250 parts sulfuric acid of 70% strength are added slowly with vigorous stirring, care being taken to keep the temperature around 50° C. 200 parts of strong sulfuric acid (96% strength) are now added slowly, the temperature being still kept at about 50° C. and the vigorous stirring continued for about 3 hours. A two layer system is formed, the lower layer containing practically all the sulfuric acid, and the upper layer containing the resin, solvent and some sulfuric acid. The latter is neutralized with hot 10% NaOH solution and washed with water. The reaction in the still plastic mass is carried further by heating in an inert atmosphere with stirring to a temperature of about 230° C. in order to expel all non-combined material, which in this case consists of all the solvent naphtha, water and very little free dipentene and butyl- phenol. In the resin thus finally obtained practically all the dipentene appears to be bound chemically to the butylphenol condensate, as none can be removed with steam at even 230° C. and the yield of resin is about 95% of the theoretical, based on the total butylphenol condensate and dipentene. The acid value of the resin is 10-20 or even lower. The resin is oil soluble, giving excellent alkali resistant varnishes, which can be used as such or in conjunction with suitable pigments for enamels and also as a binder material in the manufacturing of linoleum and similar covering materials.

Example VIII

Using the same phenolic resin as in Example VII, the amount of additional dipentene is increased to 157 parts, so that the total proportion is 2 mols dipentene to 1 mol butylphenol. Following otherwise the same method, a resin is obtained in which again practically the total dipentene is chemically bound to the butylphenol condensate.

Rather large amounts of dipentene can be incorporated in the product with the aid of only small proportions of catalyst, such as sulphuric acid, if higher temperatures are employed. Thus, 1,000 grams of an amyl phenol-formaldehyde condensate produced in the presence of sodium hydroxide and containing approximately 70% of amyl phenol-formaldehyde resin, 10% dipentene, and 20% water and excess formaldehyde, the phenol and formaldehyde having been employed in the proportion of approximately 1 part of phenol to 1 part of 40% formaldehyde, followed by acidification, is heated with 1000 grams of dipentene to about 70° C. until a uniform emulsion is formed. There are then added 25 grams of 20% sulphuric acid. The temperature is now slowly raised to about 250° C. and the heating continued at such temperature until substantially all volatile matter has been driven off. There are obtained about 1200 grams of a pale, hard, brilliant resin, the composition of which corresponds closely to a molecular combination of the amyl phenol-formaldehyde condensate and dipentene.

The small proportion of sulphuric acid does not appear to cause any polymerization of the dipentene, but appears to effect a chemical combination between the dipentene and the resin. The unreacted dipentene is recovered in the distilled matter and can be used again.

While the above examples are directed to the use of dipentene, such being the terpenic material at present preferred by me, I have found that such material can be substituted in whole or in part by other liquid terpenic materials, such as pine oil, terpineol, turpentine, etc.

Where in the claims reference is made to "a substituted phenol," such expression is to be understood as embracing not only a hydroxy benzene in which at least one of the nuclear hydrogens is substituted by a hydrocarbon radical but also condensates of phenols with ketones, as disclosed above.

I claim:

1. The method of producing fusible phenol-formaldehyde condensates soluble in varnish oils which comprises reacting a phenol of the class consisting of phenols having a substituting hydrocarbon group and condensation products of phenols with ketones, formaldehyde, and a terpene material consisting essentially of dipentene with the aid of a quantity of a base sufficient to convert the mixture into a uniform solution, at temperatures of the order of 60° C. and above, acidifying the reaction mixture, washing the condensate layer, mixing the same with a compatible natural resin, and then heating the mixture to dehydrate it and expel uncombined dipentene until a product which is solid at room temperatures is obtained and has the natural resin incorporated therein.

2. The method of producing fusible phenol-formaldehyde condensates soluble in varnish oils, which comprises reacting a phenol-acetone reaction product with formaldehyde in the presence of a terpenic material consisting essentially of dipentene, and of a quantity of a base sufficient to convert the mixture into a uniform solution, at temperatures of the order of 60° C. and above, neutralizing the base, and separating the condensate.

3. The method of producing fusible phenol-formaldehyde condensates which are soluble in varnish oils, comprising heating and reacting one mol of a phenol having a substituent hydrocarbon group of at least 4 carbon atoms, about 1 to 2 mols of formaldehyde, and a terpene material consisting essentially of dipentene in the presence of a quantity of an alkali metal base sufficient to convert the mixture into a clear uniform solution, thereafter neutralizing the base to cause separation of the mixture into an aqueous and a dipentene layer, and separating the latter.

4. A phenol-formaldehyde condensate soluble in varnish oils and comprising the reaction product of rosin, glycerol and a solid, dehydrated, acid-precipitated reaction product of the heating of a phenol having a substituent hydrocarbon group, formaldehyde, dipentene, and an inorganic base.

5. A phenol-formaldehyde condensate as set forth in claim 4, wherein the molecular proportion of formaldehyde to phenol was originally approximately 2:1.

6. A solid, fusible, dehydrated, oil-soluble, acid-separated condensate of a phenol ketone reaction product, formaldehyde, dipentene, and an alkali metal base at considerably above room temperature, said condensate containing a considerable proportion of combined dipentene and being combined wtih ester gum.

7. The method of producing fusible phenol-formaldehyde condensates soluble in varnish oils which comprises reacting a phenol having a substituting alkyl radical, and a greater than equimolecular proportion of formaldehyde in the presence of a base sufficient in amount to keep the condensate in solution, acidifying the reaction mass, heating the separated condensate with dipentene and a catalyst of the group consisting of strong acids and strongly acid salts until at least part of the dipentene has been chemically combined in the resinous product, and then mixing and heating rosin and glycerol with the reaction product until a soluble, uniform resin is obtained.

8. The method according to claim 7, wherein the phenol is a condensation product of a phenol and acetone.

9. The method according to claim 7, wherein the phenol-formaldehyde dipentene condensate is heated with the rosin in the presence of a zinc compound and with sufficient glycerol to yield a substantially neutral product.

10. The method of producing fusible phenol-formaldehyde condensates soluble in varnish oils which comprises reacting a phenol having a substituent hydrocarbon group of at least two carbon atoms, formaldehyde, and a terpene material consisting essentially of dipentene with the aid of a quantity of a base sufficient to convert the mixture into a uniform solution, at temperatures of the order of 60° C. and above, neutralizing the reaction mixture and acidifying the same with sulfuric acid, adding a further quantity of liquid terpenic material to the condensate, and heating the mixture until a soluble resinous product which is solid at room temperature is obtained.

11. The method of producing fusible phenol-formaldehyde condensates soluble in varnish oils, which comprises reacting a phenol having a substituent hydrocarbon group, formaldehyde, and a terpene material consisting essentially of dipentene with the aid of a quantity of a base sufficient to convert the mixture into a uniform solution, at temperatures of the order of 60° C. and above, acidifying the reaction mixture, washing the condensate layer, and then heating the same to dehydrate it and expel uncombined dipentene until a product which is solid at room temperatures is obtained.

12. The method of producing fusible phenol-formaldehyde condensates soluble in varnish oils, which comprises reacting a member of the group consisting of phenols having a substituting hydrocarbon group and condensation products of phenols with acetone, with formaldehyde in the presence of a terpenic material consisting essentially of dipentene, and of a quantity of a base sufficient to convert the mixture into a uniform solution, at temperatures of the order of 60° C. and above, neutralizing the base, separating the condensate and then heating the same until it is solid at room temperature.

13. The method of producing fusible phenol-formaldehyde condensates which are soluble in varnish oils, comprising heating and reacting a phenol having a substituent hydrocarbon group of at least 4 carbon atoms, formaldehyde, and a terpene material consisting essentially of dipentene in the presence of a quantity of an alkali metal base sufficient to convert the mixture into a uniform solution, thereafter neutralizing the base to cause separation of the mixture into an aqueous and a dipentene layer, separating the latter and heating it to expel water and uncombined dipentene until a fusible product which is solid at room temperature is obtained.

14. The method of producing fusible phenol-formaldehyde condensates which are soluble in varnish oils, comprising heating and reacting butyl phenol, formaldehyde, and a terpene material consisting essentially of dipentene in the presence of a quantity of an alkali metal base sufficient to convert the mixture into a uniform solution, thereafter neutralizing the base to cause separation of the mixture into an aqueous and a dipentene layer, separating the latter and heating it to expel water and uncombined dipentene until a fusible product which is solid at room temperature is obtained.

15. A phenol-formaldehyde condensate soluble in varnish oils and comprising the solid, dehydrated, acid-precipitated reaction product of the heating of a phenol having a substituent hydrocarbon group of at least two carbon atoms, formaldehyde, dipentene, and an inorganic base.

16. A phenol-formaldehyde condensate soluble in varnish oils and comprising the solid, dehydrated, acid-precipitated reaction product of the heating of a phenol selected from the group consisting of phenols having a substituting hydrocarbon group and condensation products of phenols with ketones, formaldehyde, dipentene, and an inorganic base.

17. A phenol-formaldehyde condensate as set forth in claim 16, wherein the molecular proportion of formaldehyde to phenol was originally approximately 2:1, the condensate being capable of being heated to approximately 120° C. without becoming insoluble in varnish oils.

18. A solid, fusible, dehydrated, oil-soluble, acid-separated condensate of a phenol having a substituent hydrocarbon group of at least two carbon atoms, formaldehyde, dipentene, and an alkali metal base at considerably above room temperature, said condensate containing a considerable proportion of combined dipentene.

19. A solid, fusible, dehydrated, oil-soluble, acid-separated condensate of a phenol having a substituent hydrocarbon group of at least four carbon atoms, formaldehyde, dipentene, and an alkali metal base at considerably above room temperature, said condensate containing a considerable proportion of combined dipentene.

20. A solid, fusible, dehydrated, oil-soluble, acid-separated condensate of one mol of a phenol having a substituent hydrocarbon group of at least four carbon atoms, approximately two mols of formaldehyde, dipentene, and an alkali metal hydroxide at considerably above room temperature, said condensate containing a considerable proportion of combined dipentene.

21. A phenolic condensate soluble in varnish oils and comprising a solid, dehydrated, acid-precipitated reaction product of a phenol having a substituent hydrocarbon group of at least two carbon atoms, formaldehyde, dipentene, and an alkali metal hydroxide, said condensate containing approximately 10% of combined dipentene.

ISRAEL ROSENBLUM.